Dec. 11, 1956 C. P. MacIVER 2,773,791
ARMORED GARMENT
Filed Jan. 19, 1954
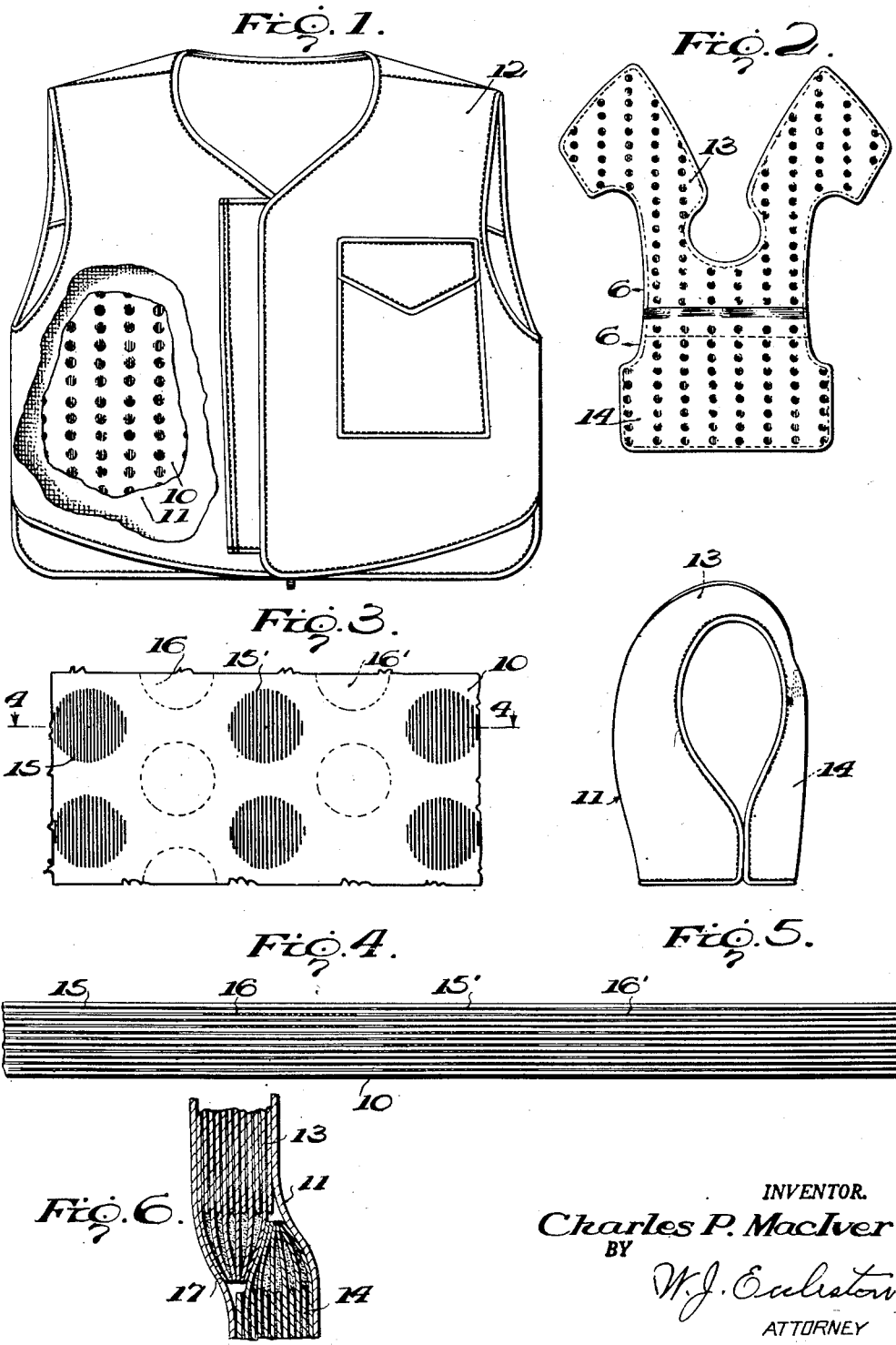
INVENTOR.
Charles P. MacIver
BY
ATTORNEY United States Patent Office 2,773,791
Patented Dec. 11, 1956

2,773,791

ARMORED GARMENT

Charles P. MacIver, Stowe, Mass., assignor to the United States of America as represented by the Secretary of the Army Application January 19, 1954, Serial No. 405,059

16 Claims. (Cl. 154—52.5)

This invention relates to body armor, and more particularly to a garment and laminated armor plate therefor, rendered highly flexible by a staggered arrangement of spot laminations between the laminated plies.

Body armor useful for military operations must be characterized not only by adequate projectile penetration resistance, but also by a high degree of flexibility, inasmuch as a stiff armor would tend to hamper the wearer in his movements and render it difficult for him to assume firing positions. Moreover, an armor plate for use in body armor must be of relatively light weight and not too bulky or subject to excessive waterlogging during amphibious operations. Armored garments and armor plates therefor, failing in these characteristics would hamper the soldier who wears them, thereby rendering him less likely to succeed in an engagement, and present him with the unpleasant choice of having to discard it at the very moment when he most needs its protection.

A flexible armored garment, which has the advantages of compactness and water resistance of a resin bonded structure can be provided by spot-laminating layers of woven high tenacity elongatable plastic material in a regular pattern wherein the laminated areas are transversely aligned depthwise through all the plies and are arranged in spaced rows extending over substantial portions of the area of the armor plate incorporated in the garment. Such armor plates flex along the interstices between the rows and are thus a substantial advance over solidly laminated armor plates. However, such armor plates are still characterized by a certain amount of stiffness in the areas covered by the resin spot-laminations.

I have found that this handicap of relative stiffness in the areas covered by the laminated resin can be overcome by arranging the spot laminations in such a manner that they are located between alternate plies, but transversely aligned, so that the respective spaced rows are staggered in depth. This arrangement renders the bonded areas comparatively flexible even in the spaces occupied by the resin spots, and moreover reduces the amount of laminating resin which has the desirable effect of somewhat decreasing the overall weight of the armor plate.

An armored garment constructed in accordance with this principle is little stiffer than an ordinary heavy overcoat and thus is no handicap to the soldier, while at the same time affording him very substantial ballistic protection.

A preferred material for an armored garment in accordance with the present invention is tightly woven nylon fabric, resin spot-laminated in from about 9 to about 20 layers, preferably about 12 to 15 layers. However, my invention is not restricted to the use of nylon material.

The accompanying drawings illustrate a preferred embodiment of my invention, but should not be deemed to limit the scope of my invention to any particular dimensions, proportions or similar details shown therein.

Figure 1 of the drawing is a front elevation, partly broken away, of an armored vest in accordance with my invention;

Figure 2 is a plan view of a spot-laminated front and back armor plate suitable for the armored garment illustrated in Figure 1, the top layer of said armor plate being removed for the purpose of illustrating the arrangement of laminating resin spots;

Figure 3 is a greatly enlarged plan view of a portion of the armor plate shown in Figure 2;

Figure 4 is a still further enlarged cross sectional edge view taken along lines 4—4 of Figure 3;

Figure 5 shows an armor plate corresponding to Figure 2 but encased in a protective envelope and bent in the configuration of a human torso, ready for incorporation in the armored vest shown in Figure 1;

Figure 6 is an enlarged sectional detailed view, substantially taken along lines 6—6 of Figure 2, but with the outer layer and envelope in place.

More particularly, the armored garment in accordance with the present invention includes a laminated plate 10 of tightly woven high tenacity elongatable textile material such as nylon, enclosed in a shell 11 of light weight water-resistance material, e. g., vinyl film or coated nylon. The armor plate and the envelope encased in the same are preferably inserted in a vest-like garment 12 of the general type shown in Figure 1; however, it will be understood, of course, that the shell itself may be fashioned into a garment structure.

A preferred armor plate for inclusion in a garment of the type above described consists of about 9 to 20, preferably 12 to 15 plies of tightly woven high tenacity elongatable plastic material; nylon being the preferred material, other strong and elongatable plastic textile materials such as strong fine regenerated cellulose fiber of the "Fortisan" or "Durafil" type are permissible though presently less preferred substitutes. A typical nylon fabric suitable for layers to be laminated in accordance with the present invention is lightweight duck cloth, having the following characteristics:

Weave, plain, two ends woven as one, 2 picks woven as one, weight 13–14 oz. per square yard;

Yarn, 210 denier, high tenacity nylon, 34 filament, minimum tensil strength 7 gm. per denier;

Warp, minimum 40 ends, in the loom, composed of 5 plied threads;

Filling, minimum 37 picks off the loom composed of 5 plied threads;

Breaking strength, minimum 775 lbs. in warp and filling (grap method);

Elongation of finished cloth, minimum 30% in warp and 25% in filling.

This cloth, in the preferred form of the present invention, is then cut into sheets or panels of the configuration shown in Fig. 2 of the drawing.

In order to construct the armor plate shown in Figure 2, which consists of a front plate 13 and a separate back plate 14, the plies constituting the front plate are cut in the general shape of a U, and the plies constituting the back plate are cut in the general form of a rectangle; however, it will be understood that the armor plate may consist of one integral front and back piece, in which case the individual plies would be cut in the general form of a Y having a wide vertical stroke.

As heretofore indicated, the plies which make up the armored plate are joined together by resin spot laminations in spaced rows, wherein the spot laminations are transversely aligned, but staggered between alternate plies. Thus, in the form of the invention illustrated, the spot laminations in one row 15 may join the first and second plies, the third and fourth plies, the fifth and sixth plies, etc., while in the adjacent row 16, the spot laminations join the second to the third, the fourth to the fifth, the sixth to the seventh ply, etc., this arrangement will repeat itself in alternating rows 15', 16', etc. In the preferred form of the invention shown in Figure 3, the spot laminations are also longitudinally staggered, i. e., the aligned spots in the second row 16 are longitudinally offset from the aligned spots in the first and third rows (15, 15'); this enables a closer spacing of the alternating depth-staggered rows. However, it will be understood of course that my invention is not confined to this specific arrangement.

In using the word "alternating," I wish this expression to be understood in its broad dictionary sense as "belonging to a series in which the members regularly intervene between, or follow by turns, the members of another series"; thus instead of the 1:1 depth stagger

(each dash — denoting an individual resin spot) between two alternating rows, a 1:1:1 depth stagger or a 2:2:2 depth stagger

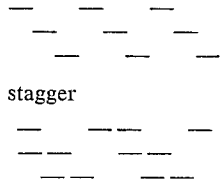

the latter two arrangements being between three alternating rows, and other permutations short of bonding all or substantially all transversely aligned spot lamination areas together, are within the contemplation of my invention, as long as there is sufficient bonding between the plies as a whole and the staggered areas retain their characteristic of substantial suppleness, as compared with the relative stiffness of a spot lamination arrangement wherein all or substantially all of the layers are bonded together in one transverse column.

The configuration and size of the individual resin lamination spots is a matter of judgment, such configuration may, for instance be circular, triangular, etc. In the preferred form of the invention shown, large circular spots, of about 1 inch diameter, are employed, the distance between spots in the same row being smaller than the maximum linear dimension (diameter) of the spots, i. e., about ⅜ inch. The distance between rows having spots on the same depth level (such as rows 15 and 15') must of course be sufficiently large to accommodate the intervening rows of a different depth level (such as row 16); in the armor plate illustrated, this distance is about 1⅜ inch. Thus, as shown in Fig. 4, the lateral distance between adjacent columns of spot-laminations at different depth levels (e. g., the lateral distance between rows 15 and 16, or the lateral distance between rows 16 and 15') is less, in the preferred form of the invention, than the width of an individual spot-lamination.

In the detail illustrated in Figure 6, alternate plies of the armor plate extend beyond the remaining plies, and the extending portions are bonded to each other so as to form a tapered edge 17. The respective tapered edges of the front and back plate, brought in juxtaposition, when inserted in envelope 13, permit partial telescoping of the armor plate assembly, which prevents the armor plate from riding up in back, when the wearer suddenly changes his body position.

The lamination resin is preferably applied to the plies by means of a stencil or printing roll. While I do not wish to limit the scope of the present invention to any particular resin, I wish to point out that I have obtained highly satisfactory ballistic results by the use of a mixture of approximately equal parts of butadiene-acrylonitrile copolymer (such as sold by Angier Products Co. as resin SBP–1562 or SBP–1433) and phenolic resin (such as sold by Angier Products Co. as resin SBP–1513 or SBP–1434). Another highly suitable formulation is a mixture of approximately equal parts of a phenol formaldehyde resin and polyvinyl butyral resin (safety glass grade) in a solvent of alcohol and toluene; such an adhesive resin is sold by Bakelite Corporation as resin BJ–16320, and by Industrial Tape Corporation as Permacel 1500, the resin solids content of this adhesive is about 33–37%. With the spot-lamination pattern arrangement, as above described, the addition of about 10 parts or less by weight of resin to each 100 parts by weight of textile material is sufficient to produce good ballistic results. Other resin binders, some of which are enumerated in Heckert, Patent No. 2,398,184, may also be employed, though probably with less favorable ballistic results.

For the purpose of increasing the water resistance of the armor plate and preventing its fraying, I prefer to coat the cut edges of the finished armored plate with the same resin.

A typical 12-ply armor plate in accordance with the present invention has a thickness of about ¼ to ⅝ inch measured from outer to inner nylon layer. A complete armored garment, as shown in Figure 1, weighs about 7½ lbs.

The water absorption of such a plate, when in its envelope 11 is gratifyingly low, when properly constructed; in a 24 hour immersion test, the armor plate assembly (front and back plate) absorbed only 1 oz. of water.

In ballistic limit tests on armored garments made in accordance with the present invention, it was found that 12-ply spot-laminated nylon armor possessed a protection ($V_{50}$) ballistic limit of 1250–1375 ft./sec.; i. e. stopped at least 50% of 17-grain fragmentation-simulating projectiles propelled against it at a velocity of 1250–1375 ft./sec. at the point of impact; this is ample protection against most hand grenade, mortar and antiaircraft shell fragments and against pistol or submachine bullets, though not against .30 cal. rifle bullets unless ricocheting or nearly spent.

While I have chiefly described my armored garment in terms of an armored vest, it will of course be understood that the principles underlying the invention may also be employed in armored garments such as trousers, abdominal protectors, and similar protective garments.

While changes in the arrangement, proportions, dimensions and shape of the armored garment and component parts thereof, disclosed in this specification will readily occur to the expert without departing from the spirit of my invention, it is my desire to encompass such variations within the scope of such invention, I thus desire to be limited only by the appended claims.

I claim:

1. Armored garment comprising outer, a plurality of intermediate, and inner layers of woven high tenacity elongatable plastic textile material, said layers being resin spot-laminated, the spot-laminations of said outer, intermediate and inner layers being located between alternate plies and transversely aligned in columns, and said spot-laminations being discontinuous and arranged in spaced rows extending over substantial portions of the area of said garment, said spaced rows being staggered in depth; whereby said garment is rendered highly flexible.

2. Armored garment comprising outer, a plurality of intermediate, and inner layers of woven nylon textile material, said layers being resin spot-laminated, the spot-laminations of said outer, intermediate and inner layers being located between alternate plies and transversely aligned in columns, and said spot-laminations being discontinuous and arranged in spaced rows extending over substantial portions of the area of said garment, said spaced rows being staggered in depth; whereby said garment is rendered highly flexible.

3. Armored garment comprising outer, a plurality of intermediate, and inner layers of woven high tenacity elongatable plastic textile material, said layers being resin spot-laminated, the spot-laminations of said outer, intermediate and inner layers being located between alternate plies and transversely aligned in columns, and said spot-laminations being discontinuous and arranged in spaced rows extending over substantial portions of the area of said garment, said spaced rows being staggered longitudinally and in depth; whereby said garment is rendered highly flexible.

4. Armored garment comprising outer, a plurality of intermediate, and inner layers of woven high tenacity elongatable plastic textile material, said layers being resin spot-laminated, the spot-laminations of said outer, intermediate and inner layers being located between alternate plies and transversely aligned in columns, and said spot-laminations being of large dimensions, discontinuous and arranged in spaced rows extending over substantial portions of the area of said garment, said spaced rows being staggered in depth, and the interstices between said spot-laminations in said rows being less than the maximum linear dimensions of said spot-laminations; whereby said garment is rendered highly flexible.

5. Armored garment comprising outer, a plurality of intermediate, and inner layers of woven high tenacity elongatable plastic textile material, said layers being resin spot-laminated, the spot-laminations of said outer, intermediate and inner layers being located between alternate plies and transversely aligned in columns, and said spot-laminations being of circular configuration and arranged in spaced rows extending over substantial portions of the area of said garment, said spaced rows being staggered in depth; whereby said garment is rendered highly flexible.

6. Armored garment according to claim 1, wherein the number of said layers is about 9 to 20.

7. Armored garment according to claim 1, wherein said laminated resin is a mixture of butadiene-acrylonnitrile copolymer and phenolic resin.

8. Armored garment according to claim 1, enclosed in a shell of thin flexible water-resistant material.

9. Flexible armor plate for an armored garment, said armor plate comprising outer, a plurality of intermediate, and inner layers of woven high tenacity elongatable plastic textile material, said layers being resin spot-laminated, the spot-laminations of said outer, intermediate and inner layers being located between alternate plies and transversely aligned in columns, and said spot-laminations being discontinuous and arranged in spaced rows extending over substantial portions of the area of said armor plate, said spaced rows being staggered in depth.

10. Flexible armor plate for an armored garment, said armor plate comprising about 9 to about 20 outer, intermediate and inner layers of woven high tenacity elongatable plastic textile material, said layers being resin spot-laminated, the spot-laminations of said outer, intermediate and inner layers being located between alternate plies and transversely aligned in columns, and said spot-laminations being discontinuous and arranged in spaced rows extending over substantial portions of the area of said armor plate, said spaced rows being staggered longitudinally and in depth.

11. Flexible armor plate for an armored garment, said armor plate comprising outer, a plurality of intermediate, and inner layers of woven high tenacity elongatable plastic textile material, said layers being resin spot-laminated, the spot-laminations of said outer, intermediate and inner layers being located between alternate plies and transversely aligned in columns, and said spot-laminations being of large dimensions, discontinuous and arranged in spaced rows extending over substantial portions of the area of said armor plate, said spaced rows being staggered longitudinally and in depth.

12. Flexible armor plate for an armored garment, said armor plate comprising outer, a plurality of intermediate, and inner layers of woven high tenacity elongatable plastic textile material, said layers being resin spot-laminated, the spot-laminations of said outer, intermediate and inner layers being located between alternate plies and transversely aligned in columns, and said spot-laminations being of circular configuration and arranged in spaced rows extending over substantial portions of the area of said armor plate, said spaced rows being staggered in depth.

13. Flexible armor plate according to claim 9, wherein said textile material is nylon.

14. Flexible armor plate according to claim 9, wherein alternate plies extend beyond the remaining plies, said extending portions being bonded to each other so as to form a tapered edge for said armor plate.

15. Armored garment comprising outer, a plurality of intermediate, and inner layers of woven high tenacity elongatable plastic textile material, said layers being resin spot-laminated, the spot-laminations of said outer, intermediate and inner layers being located between alternate plies and transversely aligned, and said spot-laminations being arranged in spaced rows extending over substantial portions of the area of said garment, said spaced rows being staggered in depth, and the lateral distances between said spaced rows on different depth levels being less than the width of said spot laminations; whereby said garment is rendered highly flexible.

16. Flexible armor plate for an armored garment, said armor plate comprising outer, a plurality of intermediate, and inner layers of woven high tenacity elongatable plastic textile material, said layers being resin spot-laminated, the spot-laminations of said outer, intermediate and inner layers being located between alternate plies and transversely aligned, and said spot-laminations being arranged in spaced rows extending over substantial portions of the area of said armor plate, said spaced rows being staggered in depth, and the lateral distances between said spaced rows on different depth levels being less than the width of said spot laminations.

References Cited in the file of this patent

UNITED STATES PATENTS

| Number | Name | Date |
|---|---|---|
| 1,758,296 | Schaumann | May 13, 1930 |
| 1,924,472 | Thomson | Aug. 29, 1933 |
| 2,027,425 | Hall | Jan. 14, 1936 |
| 2,142,463 | Upson | Jan. 3, 1939 |
| 2,164,499 | Coughlin | July 4, 1939 |
| 2,640,987 | Ehlers | June 9, 1953 |
| 2,697,054 | Dietz et al. | Dec. 14, 1954 |

FOREIGN PATENTS

| 226,748 | Germany | Oct. 8, 1910 |